US012375383B2

(12) United States Patent
Schnieders

(10) Patent No.: US 12,375,383 B2
(45) Date of Patent: Jul. 29, 2025

(54) RELIABLE AND ACCURATE LATENCY MEASUREMENT

(71) Applicant: Deutsche Telekom AG, Bonn (DE)

(72) Inventor: Dominik Schnieders, Aachen (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/513,799

(22) Filed: Nov. 20, 2023

(65) Prior Publication Data

US 2024/0171496 A1 May 23, 2024

(30) Foreign Application Priority Data

Nov. 22, 2022 (EP) ..................... 22208852

(51) Int. Cl.
*H04L 43/50* (2022.01)
*H04L 43/10* (2022.01)

(52) U.S. Cl.
CPC .............. *H04L 43/50* (2013.01); *H04L 43/10* (2013.01)

(58) Field of Classification Search
CPC ................ H04L 43/50; H04L 43/10
See application file for complete search history.

(56) References Cited

U.S. PATENT DOCUMENTS 7,333,517 B2 * 2/2008 Madhavapeddi ... H04L 12/2854
 370/516
7,366,790 B1 4/2008 Rustad et al.
11,063,857 B2 * 7/2021 Tewari ................ H04L 43/0811
11,212,227 B2 * 12/2021 Pan ..................... H04L 43/0858
11,252,088 B2 * 2/2022 Tadimeti ............. H04L 43/087
11,563,684 B2 * 1/2023 Ignatchenko ......... H04L 45/745
(Continued)

FOREIGN PATENT DOCUMENTS

EP 4072042 A1 10/2022

OTHER PUBLICATIONS

Mnisi N. V. et al: "Active Throughput Estimation Using RTT of Differing ICMP Packet Sizes", Third International Conference on Broadband Communications, Information Technology & Biomedical Applications, IEEE, Nov. 23, 2008 (Nov. 23, 2008), pp. 480-485, Piscataway, NJ, USA, XP031368325, ISBN: 978-1-4244-3281-3.

*Primary Examiner* — Rachel J Hackenberg
(74) *Attorney, Agent, or Firm* — LEYDIG, VOIT & MAYER, LTD.

(57) ABSTRACT

A method for measuring a latency of a connection includes a sender of a distributed application that transmits a plurality of data packets to a receiver of the distributed application via a connection. A measuring application transmits a plurality of packets to an application server, receives a plurality of echo packets from the application server, where each echo packet is caused by a transmitted packet, and calculates time intervals between transmitting a packet and receiving the caused echo packet. The measuring application determines a transmission stop time of a transmitted data packet as a time point when the calculated time intervals rapidly shorten, and/or a transmission start time of a transmitted data packet as a time point when the calculated time intervals rapidly lengthen, and/or a packet rate of the transmitted data packets by counting the transmission start times or the transmission stop times during a second.

15 Claims, 2 Drawing Sheets

4 distributed real-time application
40 sender
401 data packets
400 network socket 3 measuring application
31 ping packet
32 ping packet
30 network socket 10 operating system 310 ping IP packet
4010 data IP packets
320 ping IP packet
402 transmission start time
403 transmission stop time

(56) References Cited

U.S. PATENT DOCUMENTS

| | | | |
|---|---|---|---|
| 11,627,063 B1* | 4/2023 | Li | H04L 43/087 |
| | | | 709/224 |
| 2006/0153089 A1* | 7/2006 | Silverman | H04L 43/10 |
| | | | 370/252 |
| 2006/0221854 A1 | 10/2006 | Price et al. | |
| 2021/0240258 A1* | 8/2021 | Son | G06T 3/40 |

* cited by examiner 4 distributed real-time application
40 sender
401 data packets
400 network socket 3 measuring application
31 ping packet
32 ping packet
30 network socket 10 operating system 310 ping IP packet
4010 data IP packets
320 ping IP packet
402 transmission start time
403 transmission stop time 2 application server
52 edge cloud server 20 operating system
410 network socket
401 data packet
4 distributed real-time application
41 receiver 1 terminal device
50 communication connection
51 node
53 backbone
6 Internet

RELIABLE AND ACCURATE LATENCY MEASUREMENT

This application claims benefit to European Patent Application No. EP 22 208 852.8, filed on Nov. 22, 2022, which is hereby incorporated by reference herein.

FIELD

The invention relates to a method for measuring a latency of a communication connection, wherein a sender of a distributed real-time application periodically transmits a plurality of data packets to a receiver of the distributed real-time application via a communication connection provided by a communication network, the sender being executed by a terminal device and the receiver being executed by an application server, and a separate measuring application being executed by the terminal device periodically transmits a plurality of ping packets to the application server via the communication connection, receives a plurality of echo packets from the application server via the communication connection, each echo packet being caused by a transmitted ping packet, and calculates time intervals between transmitting a ping packet and receiving the caused echo packet. The invention further relates to a method for determining a timing of a distributed real-time application, a terminal device and a computer program product.

BACKGROUND

A distributed real-time application comprises an application frontend and an application backend. The application frontend and the application backend are configured for transmitting application data via a communication network. Both the application frontend and the application backend may be the sender or the receiver. The application data is usually periodically transmitted as a plurality of data packets. Distributed real-time applications may be also referred to as near-real-time-applications, time-critical applications or latency-critical applications.

The sender and the receiver may be executed by a first computing device and a second computing device, respectively. The first and second computing devices may be connected via a communication connection provided by the communication network.

Each distributed real-time application suffers from and may even fail due to a high latency and/or a high jitter, i.e., variability of the latency, of the communication connection. The latency of the communication connection is essentially caused by a queue time, i.e. a time interval required for IP packets to pass through a queue provided by a node of the communication network providing the communication connection.

SUMMARY

In an embodiment, the present disclosure provides a method for determining a timing of a distributed real-time application, the method comprising: a sender of a distributed real-time application periodically transmits a plurality of data packets to a receiver of the distributed real-time application via a communication connection provided by a communication network, the sender being executed by a terminal device and the receiver being executed by an application server; and a separate measuring application being executed by the terminal device periodically transmits a plurality of ping packets to the application server via the communication connection with a ping rate at least doubling a packet rate of the transmitted data packets, receives a plurality of echo packets from the application server via the communication connection, wherein each echo packet being caused by a transmitted ping packet, and calculates time intervals between transmitting a ping packet and receiving the caused echo packet, and wherein: the measuring application determines a transmission stop time of a transmitted data packet as a time point when the calculated time intervals rapidly shorten; and/or the measuring application determines a transmission start time of a transmitted data packet as a time point when the calculated time intervals rapidly lengthen; and/or the measuring application determines a packet rate of the transmitted data packets by counting the transmission start times or the transmission stop times during a second.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
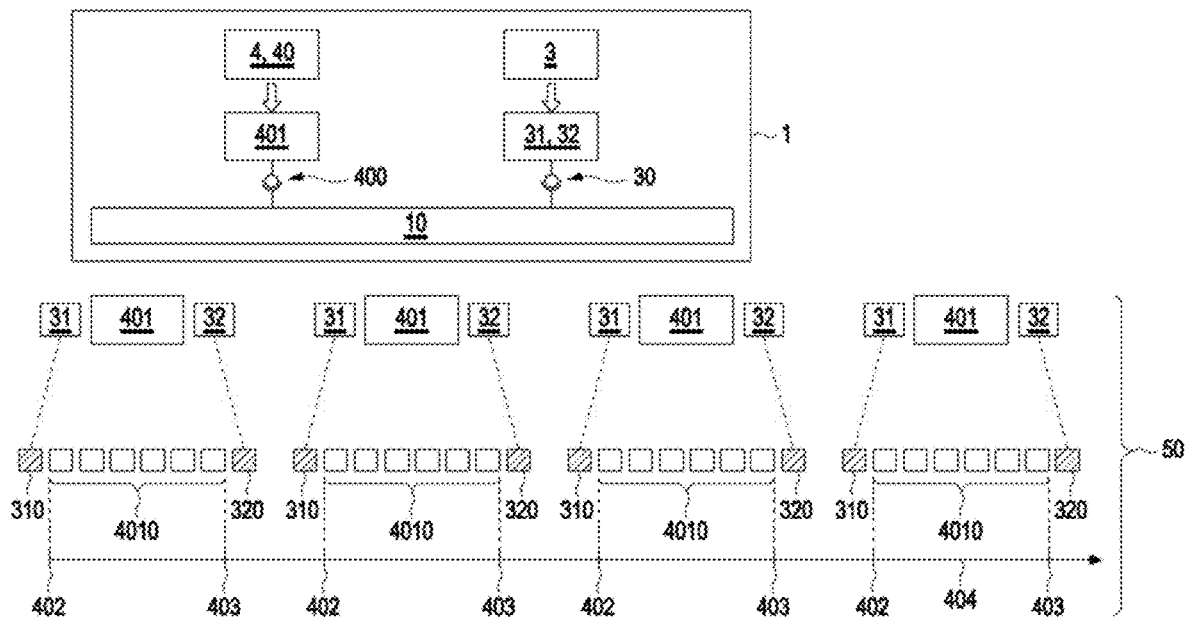
FIG. 1 schematically shows an entity diagram of a terminal device according to an embodiment of the invention.

In accordance with an embodiment, the present invention provides a method for measuring a latency of a communication connection that allows for a reliable and accurate measurement of the latency of a communication connection used by a distributed real-time application without modifying the distributed real-time application.

One aspect of the invention is a method for determining a timing of a distributed real-time application, wherein a sender of a distributed real-time application periodically transmits a plurality of data packets to a receiver of the distributed real-time application via a communication connection provided by a communication network, the sender being executed by a terminal device and the receiver being executed by an application server; and a separate measuring application being executed by the terminal device periodically transmits a plurality of ping packets to the application server via the communication connection, receives a plurality of echo packets from the application server via the communication connection, each echo packet being caused by a transmitted ping packet, and calculates time intervals between transmitting a ping packet and receiving the caused echo packet. The timing of the distributed real-time application relates to the data packets transmitted by the distributed real-time application, i.e., a timing of the transmission. The plurality of data packets may be referred to as a data stream.

Both the terminal device and the application server are connected to the communication network while executing the distributed real-time application.

According to an embodiment of the invention, the ping packets are transmitted with a ping rate at least doubling a packet rate of the transmitted data packets, the measuring application determines a transmission stop time of a transmitted data packet as a time point when the calculated time intervals rapidly shorten; and/or the measuring application determines a transmission start time of a transmitted data packet as a time point when the calculated time intervals rapidly lengthen; and/or the measuring application determines a packet rate of the transmitted data packets by counting the transmission start times or the transmission stop times during a second. The transmission timing comprises transmission stop times of data packets, transmission start times of data packets and a transmission rate of the data packets.

Each transmitted data packet lengthens a queue provided by a node of the communication network and assigned to the communication connection and, hence, a queue time of the data packet. As both the ping packets and the data packets pass through the queue, a queue time of a ping packet is affected by a queue time of a data packet, i.e. the ping packets may be delayed by the data packets. Queue times of ping packets transmitted between transmitted data packets are shorter than queue times of ping packets transmitted during transmitted data packets. In fact, the delay function of the ping packets has a rectangular behavior over time. When a transmission of a data packet starts, delays of the ping packets rapidly increase. When a transmission of a data packet stops, delay of the ping packets rapidly decreases. Each rapid increase or rapid decrease or a pair of a rapid increase and a subsequent rapid decrease indicates a transmitted data packet.

In contrast, the ping packets do not essentially delay the data packets as the ping packets are very small as compared with the data packets. In other words, a ping packet hardly affects a data packet.

A determined transmission start time of a data packet and the determined packet rate allow for calculating future transmission start times of future data packets. A determined transmission stop time of a data packet and the determined packet rate allow for calculating future transmission stop times of future data packets in case sizes of the data packets are constant or essentially constant.

The ping rate doubling the packet rate may be required for consistency with the anti-aliasing theorem related to scanning frequencies. According to the anti-aliasing theorem scanning with a scan frequency allows for reliably determining frequencies below half of the scan frequency. Of course, the ping rate may be higher than twice the packet rate. However, the ping rate may not exceed a threshold rate. Above the threshold rate the ping packets congest the queue.

It is noted that the measuring application does not communicate with the distributed real-time application. Accordingly, the distributed real-time application is not required to provide an interface for communicating with the measuring application. The method does not imply any modification of the distributed real-time application.

Another aspect of the invention is a method for measuring a latency of a communication connection provided by a communication network, wherein a sender of a distributed real-time application periodically transmits a plurality of data packets to a receiver of the distributed real-time application via the communication connection, the sender being executed by a terminal device and the receiver being executed by an application server, and a measuring application transmits a ping packet to the application server, receives an echo packet caused by the transmitted ping packet from the application server via the communication connection and calculates a time interval between transmitting the ping packet and receiving the echo packet.

According to the invention, the ping packet is transmitted after a determined transmission stop time of a data packet at a time offset and the time interval is calculated as a measured latency of the communication connection. For instance, the time offset may be 2 ms. The time offset causes the ping packet to be transmitted immediately after the transmitted data packet, i.e., at a time where a length of the queue is large.

Strictly speaking, the calculated time interval indicates a round trip time (RTT) of the communication connection. However, the round trip time mainly results from the queue time and, hence, with a transmission time of the communication connection. The transmission time is usually referred to as the latency of the communication connection.

It is noted that the measuring application does not communicate with the distributed real-time application. Accordingly, the distributed real-time application is not required to provide an interface for communicating with the measuring application. The method does not imply any modification of the distributed real-time application.

The transmission stop time may be determined by a method according to the invention for determining a timing of a distributed real-time application. Determining the transmission stop time does not imply any modification of the distributed real-time application.

In a preferred embodiment, the measuring application transmits another ping packet before a determined transmission start time of a data packet with a time offset and receives another echo packet caused by the transmitted other ping packet from the application server via the communication connection; the measuring application calculates another time interval between transmitting the other ping packet and receiving the other echo packet and an average of the calculated time interval and the calculated other time interval as the measured latency of the communication connection. For instance, the time offset may be 2 ms. The time offset causes the ping packet to be transmitted immediately before the transmitted data packet, i.e., at a time where a length of the queue is small. The average of the time interval and the other time interval are considered the best approximation to the latency of the communication connection.

The transmission start time may be determined by a method according to the invention for determining a timing of a distributed real-time application. Determining the transmission start time does not imply any modification of the distributed real-time application.

Advantageously, each of the receiver, the sender and the measuring application uses a separate network socket provided by an operating system of the application server and an operating system of the terminal device, respectively, the separate network sockets being mapped to the communication connection. The separate network sockets avoid or at least reduce an interference, i.e. a reciprocal affection, of the sender and the measuring application at the level of the operating system.

In a favorable embodiment, the measuring application transmits at least one ping packet for each transmitted data packet. The more data packets are used for measuring the more accurate the latency is determined.

The distributed real-time application may be a cloud gaming application, a cloud augmented reality (AR) application, a cloud virtual reality (VR) application, a video conferencing application or a remote driving application. The list is not exclusive. Further distributed applications may be real-time applications.

The sender may transmit a video stream as the plurality of data packets, the packet rate being a frame rate of the video stream. Video streams are common data streams of distributed real-time applications.

Preferably, a cellular network as the communication network provides a radio connection as the communication connection and a mobile device is connected to the cellular network as the terminal device. The mobile device may be referred to as user equipment (UE). The mobile device may be configured to be a smartphone, a tablet, a notepad, a car and the like. Also a WLAN access point and the like as the communication network may provide the radio connection as the communication connection. Of course, a wired network, e.g. a fixed-line network, as the communication network may provide the communication connection, with stationary terminal devices being connected thereto.

It is further preferred that an edge cloud server executes the receiver as the application server. The edge cloud server is arranged near to the node providing the radio connection, the node being a base transceiver station (BTS) of the cellular network. The arrangement near to the node implies short wire or fiber lengths between the sender and the receiver and, thus, allows for short transmission times of data packets which further reduces the latency.

Preferably, the cellular network assigns a QoS feature to the communication connection or the communication connection to a slice of the cellular network or actively reduces a jitter of the communication connection by cooperating with the distributed real-time application. In other words, the communication connection may provide a low latency for the distributed real-time application. The low latency may be based on the QoS (Quality of Service) feature booked by a user of the terminal device. The terminal device may generally be referred to as user equipment (UE) and particularly be configured as a smartphone, a tablet, a notepad, a smart device and the like.

The communication network may provide the communication connection assigned to a dedicated LTE bearer or a 5G QoS flow. The dedicated LTE (Long Term Evolution, 4G) bearer and the 5G QoS flow further reduce a latency of the communication connection.

A third aspect of the invention is a terminal device with a sender of a distributed real-time application and a measuring application.

According to the invention, the measuring application is configured for carrying out a method according to an embodiment of the invention in cooperation with an application server comprising a receiver of the distributed real-time application and a communication network. By installing the measuring application in the terminal device, the terminal device is easily upgraded to an inventive terminal device.

A fourth aspect of the invention is a computer program product, comprising a storage medium with a program code. The storage medium may be configured as a CD (compact disc), a DVD (digital versatile disk), a USB (universal serial bus) stick, a hard drive, a RAM (random access memory) chip, a cloud storage and the like.

According to the invention, the program code causes a terminal device to execute a measuring application configured for carrying out a method according to an embodiment of the invention in cooperation with an application server and a communication network when being executed by a processor of the terminal device. The computer program product allows for upgrading a terminal device to an inventive terminal device.

An advantage of the inventive method is a high reliability and accuracy of a measured latency of a communication connection used by a distributed real-time application without requiring a modification of the distributed real-time application.

It shall be understood that the features described previously and to be described subsequently may be used not only in the indicated combinations but also in different combinations or on their own without leaving the scope of the present invention.

The invention is described in detail by means of an exemplary embodiment and with reference to the drawings. Like components are indicated by like reference numerals throughout the drawings.

FIG. 1 schematically shows an entity diagram of the terminal device 1 according to an embodiment of the invention. The terminal device 1 comprises an operating system 10, a sender 40 of a distributed real-time application 4 and a separate measuring application 3.

The measuring application 3 is configured for carrying out a method according to the invention as follows in cooperation with an application server 2 comprising a receiver 41 of the distributed real-time application 4 and a communication network 5 (see FIG. 2).

The terminal device 1 may be set up using a computer program product with a storage medium storing a program code. The program code causes the terminal device 1 to execute the measuring application 3 configured for carrying out a method as follows in cooperation with the application server 2 and the communication network 5 when being executed by a processor of the terminal device 1.

A first method is carried out for determining a timing of the distributed real-time application 4.

The sender 40 of the distributed real-time application 4 is executed by the terminal device 1 and the receiver 41 of the distributed real-time application 4 is executed by the application server 2. The sender 40 periodically transmits a plurality of data packets 401 to the receiver 41 via the communication connection 50 provided by the communication network 5.

The separate measuring application 3 is executed by the terminal device 1 and periodically transmits a plurality of ping packets to the application server 2 via the communication connection 50 with a ping rate at least doubling a packet rate of the transmitted data packets 401. The measuring application 3 receives a plurality of echo packets from the application server 2 via the communication connection 50, each echo packet being caused by a transmitted ping packet. The measuring application 3 calculates time intervals between transmitting a ping packet and receiving the caused echo packet.

The measuring application determines a transmission stop time 403 of a transmitted data packet 401 as a time point when the calculated time intervals rapidly shorten. Alternatively or additionally, the measuring application 3 determines a transmission start time 402 of a transmitted data packet 401 as a time point when the calculated time intervals rapidly lengthen. Transmission start times 402 and transmission stop times 403 of transmitted data packets 401 are indicated on a time scale 404. Additionally, the measuring application 3 may determine a packet rate of the transmitted data packets 401 by counting the transmission start times 402 or the transmission stop times 403 during a second.

A second method is carried out for measuring a latency of a communication connection 50.

The sender 40 of the distributed real-time application 4 is executed by the terminal device 1 and the receiver 41 of the distributed real-time application 4 is executed by the application server 2. The sender 40 periodically transmits a plurality of data packets 401 to the receiver 41 via the communication connection 50 provided by the communication network 5.

The measuring application 3 transmits a ping packet 32 after a determined transmission stop time 403 of a data packet 401 with a time offset. Both the transmitted ping packets 32 and the transmitted data packets 401 are stripped down to ping IP (Internet Protocol) packets 320 and data IP packets 4010, respectively, by an TCP (Transmission Control Protocol)/IP module of the operating system 10 of the terminal device 1. While each transmitted ping packet 32 is stripped down to a single ping IP packet 320, each transmitted data packet 401 is stripped down to a plurality of data IP packets 4010.

The transmission stop time 403 may have been determined by carrying out the first method described above. The measuring application 3 receives an echo packet caused by the transmitted ping packet 32 from the application server 2 via the communication connection 50. The measuring application 3 calculates a time interval between transmitting the ping packet 32 and receiving the echo packet as a measured latency of the communication connection 50.

Preferably, the measuring application 3 transmits another ping packet 31 before a determined transmission start time 402 of a data packet 401 with a time offset. The transmitted other ping packets 31 are stripped down to ping IP packets 310 by the TCP/IP module of the operating system 10 of the terminal device 1. Each transmitted other ping packet 31 is stripped down to a single ping IP packet 310.

The transmission start time 402 may have been determined by carrying out the first method described above. The measuring application 3 receives another echo packet caused by the transmitted other ping packet 31 from the application server 2 via the communication connection 50. The measuring application 3 calculates another time interval between transmitting the other ping packet 31 and receiving the other echo packet and an average of the calculated time interval and the calculated other time interval as the measured latency of the communication connection 50.

The measuring application 3 preferably transmits at least one ping packet 32, 31 for each transmitted data packet 401.

Each of the receiver 41, the sender 40 and the measuring application 3 may use a separate network socket 30, 400, 410 provided by an operating system 20 of the application server 2 and an operating system 10 of the terminal device 1, respectively. The separate network sockets 30, 400, 410 are mapped to the communication connection 50.

The distributed real-time application 4 may be a cloud gaming application, a cloud augmented reality application, a cloud virtual reality application, a video conferencing application or a remote driving application. The sender 40 may transmit a video stream as the plurality of data packets, the packet rate being a frame rate of the video stream.

Preferably, a cellular network as the communication network 5 provides a radio connection as the communication connection 50 and a mobile device is connected to the cellular network as the terminal device 1.

Figure 2:
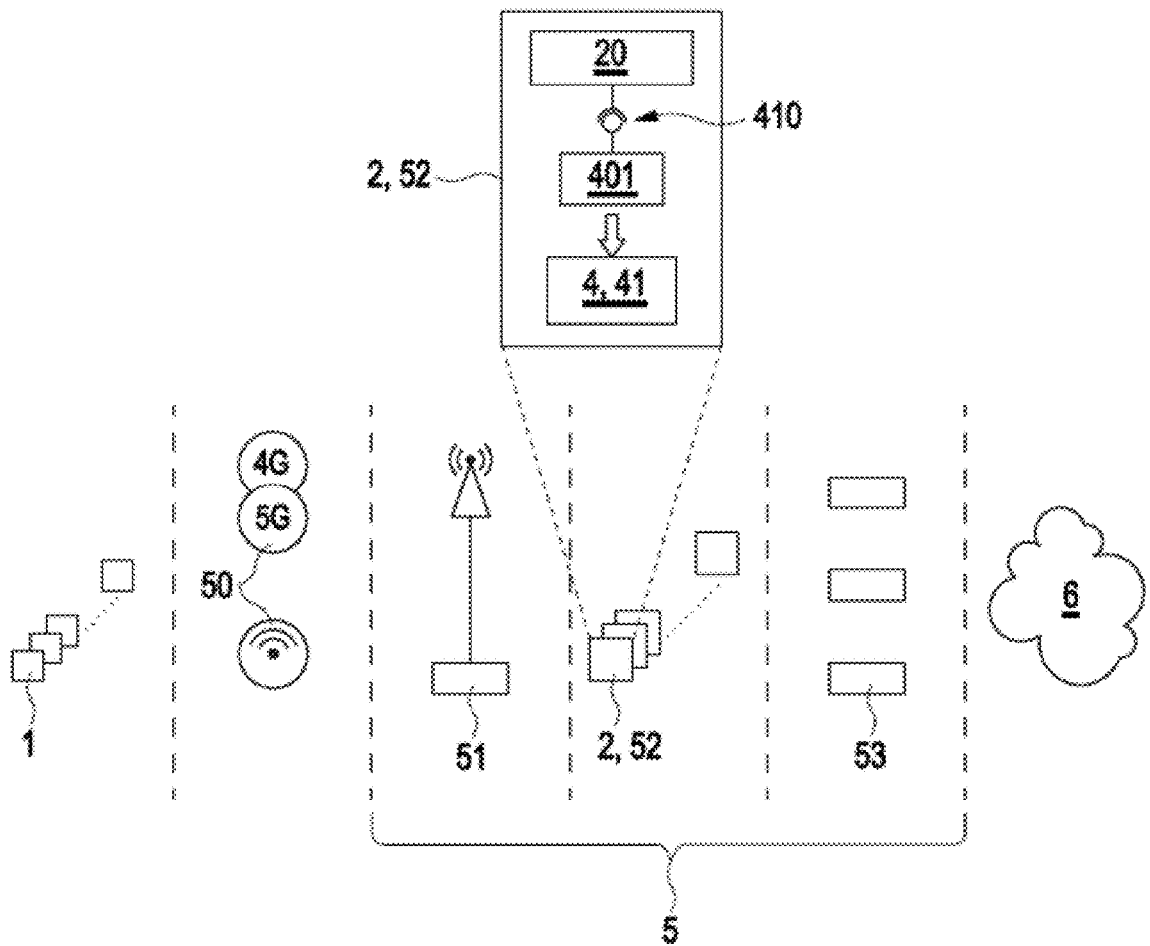
FIG. 2 schematically shows an entity diagram of a cellular network connected to by the terminal device shown in FIG. 1.

FIG. 2 schematically shows an entity diagram of the cellular network connected to by the terminal device 1 shown in FIG. 1. An edge cloud server may execute the receiver 41 as the application server 2. The cellular network comprises a node 51, an edge cloud server 52 and a backbone 53. The cellular network may be connected to an internet 6.

The cellular network may assign a QoS (Quality of Service) feature to the communication connection 50 or the communication connection 50 to a slice of the cellular network or actively reduce a jitter of the communication connection 50 by cooperating with the distributed real-time application 4.

The communication network 5 may provide the communication connection 50 assigned to a dedicated LTE (Long Term Evolution, 4G) bearer or to a 5G QoS flow.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 1 terminal device
10 operating system
2 application server
20 operating system
3 measuring application
30 network socket
32 ping packet
320 ping IP packet
31 other ping packet
310 other ping IP packet
4 distributed real-time application
40 sender
400 network socket
401 data packet
4010 data IP packet
402 transmission start time
403 transmission stop time
404 time scale
41 receiver
410 network socket
5 communication network
50 communication connection
51 node
52 edge cloud server
53 backbone
6 internet

The invention claimed is:

1. A method, comprising:
periodically transmitting, by a sender of a distributed real-time application, a plurality of data packets to a receiver of the distributed real-time application via a communication connection provided by a communication network, wherein the sender is executed by a terminal device and the receiver is executed by an application server;
periodically transmitting, by a separate measuring application executed by the terminal device, a plurality of ping packets to the application server via the communication connection, wherein a ping rate of periodically transmitting the ping packets is at least double a packet rate of periodically transmitting the data packets, and wherein the measuring application is installed on the terminal device;
receiving, by the measuring application, a plurality of echo packets from the application server via the communication connection, wherein each echo packet is responsive to a respective ping packet; and
calculating, by the measuring application, time intervals between respective ping and echo packets;
wherein the method further comprises:
determining, by the measuring application, a transmission stop time of a transmitted data packet as a time point corresponding to a shortening of the calculated time intervals; and/or
determining, by the measuring application, a transmission start time of a transmitted data packet as a time point corresponding to a lengthening of the calculated time intervals.

2. The method according to claim 1, further comprising:
after determining the transmission stop time, transmitting, by the measuring application, a ping packet after the transmission stop time with a time offset;
receiving, by the measuring application, an echo packet responsive to the ping packet from the application server via the communication connection; and
calculating, by the measuring application, a time interval between transmitting the ping packet and receiving the echo packet as a measured latency of the communication connection.

3. The method according to claim 1, further comprising:
after determining the transmission stop time, transmitting, by the measuring application, a ping packet after the transmission stop time with a time offset;
receiving, by the measuring application, an echo packet responsive to the ping packet from the application server via the communication connection;
calculating, by the measuring application, a time interval between transmitting the ping packet and receiving the echo packet;
transmitting, by the measuring application, another ping packet before the transmission start time with a time offset;
receiving, by the measuring application, another echo packet responsive to the other ping packet from the application server via the communication connection;
calculating, by the measuring application, another time interval between transmitting the other ping packet and receiving the other echo packet; and
calculating, by the measuring application, an average of the calculated time interval and the calculated other time interval as the measured latency of the communication connection.

4. The method according to claim 1, wherein the sender and the measuring application use respective network sockets provided by an operating system of the terminal device:
wherein the receiver uses a respective network socket provided by an operating system of the application server; and
wherein the respective network sockets provided by the operating systems of the terminal device and the application server are mapped to the communication connection.

5. The method according to claim 1, wherein the measuring application transmits at least one respective ping packet for each respective transmitted data packet.

6. The method according to claim 1, wherein the distributed real-time application is a cloud gaming application, a cloud augmented reality application, a cloud virtual reality application, a video conferencing application or a remote driving application.

7. The method according to claim 1, wherein the sender transmits a video stream as the plurality of data packets.

8. The method according to claim 1, wherein the communication network is a cellular network, and the terminal device is a mobile device.

9. The method according to claim 8, wherein the application server is an edge cloud server.

10. The method according to claim 8, wherein;
the cellular network assigns a QoS feature to the communication connection;
the cellular network assigns the communication connection to a slice of the cellular network; or
the cellular network actively reduces a jitter of the communication connection by cooperating with the distributed real-time application.

11. The method according to claim 8, wherein the communication connection is assigned to a dedicated LTE bearer or to a 5G QoS flow.

12. The method according to claim 1, further comprising:
determining, by the measuring application, a packet rate of transmitted data packets based on counting transmission start times or transmission stop times during a time interval.

13. The method according to claim 12, wherein the sender transmits a video stream as the plurality of data packets; and
wherein the determined packet rate is a frame rate of the video stream.

14. A terminal device, comprising:
a processor; and
a non-transitory memory having processor-executable instructions stored thereon;
wherein the processor is configured to execute the processor-executable instructions to facilitate performance of the following by the terminal device:
periodically transmitting, by a sender of a distributed real-time application, a plurality of data packets to a receiver of the distributed real-time application via a communication connection provided by a communication network, wherein the sender is executed by the terminal device and the receiver is executed by an application server;
periodically transmitting, by a separate measuring application executed by the terminal device, a plurality of ping packets to the application server via the communication connection, wherein a ping rate of periodically transmitting the ping packets is at least double a packet rate of periodically transmitting the data packets, and wherein the measuring application is installed on the terminal device;

receiving, by the measuring application, a plurality of echo packets from the application server via the communication connection, wherein each echo packet is responsive to a respective ping packet; and calculating, by the measuring application, time intervals between respective ping and echo packets;

wherein the processor is further configured to execute the processor-executable instructions to facilitate performance of the following by the terminal device:

determining, by the measuring application, a transmission stop time of a transmitted data packet as a time point corresponding to a shortening of the calculated time intervals; and/or determining, by the measuring application, a transmission start time of a transmitted data packet as a time point corresponding to a lengthening of the calculated time intervals.

15. A non-transitory computer-readable storage medium having processor-executable instructions stored thereon, wherein the processor-executable instructions, when executed, facilitate performance of the following by a terminal device:

periodically transmitting, by a sender of a distributed real-time application, a plurality of data packets to a receiver of the distributed real-time application via a communication connection provided by a communication network, wherein the sender is executed by the terminal device and the receiver is executed by an application server;

periodically transmitting, by a separate measuring application executed by the terminal device, a plurality of ping packets to the application server via the communication connection, wherein a ping rate of periodically transmitting the ping packets is at least double a packet rate of periodically transmitting the data packets, and wherein the measuring application is installed on the terminal device;

receiving, by the measuring application, a plurality of echo packets from the application server via the communication connection, wherein each echo packet is responsive to a respective ping packet; and calculating, by the measuring application, time intervals between respective ping and echo packets;

wherein the processor-executable instructions, when executed, further facilitate performance of the following by the terminal device:

determining, by the measuring application, a transmission stop time of a transmitted data packet as a time point corresponding to a shortening of the calculated time intervals; and/or determining, by the measuring application, a transmission start time of a transmitted data packet as a time point corresponding to a lengthening of the calculated time intervals.

\* \* \* \* \*